US005181047A

United States Patent [19]

Sasaki

[11] Patent Number: 5,181,047

[45] Date of Patent: Jan. 19, 1993

[54] THERMAL HEAD

[75] Inventor: Katsunari Sasaki, Hino, Japan

[73] Assignee: Kabushiki Kaisha Toshiba, Kawasaki, Japan

[21] Appl. No.: 507,886

[22] Filed: Apr. 12, 1990

[30] Foreign Application Priority Data

Apr. 14, 1989 [JP] Japan .................................... 1-94895

[51] Int. Cl.[5] ........................ B41J 2/335; H04N 1/032

[52] U.S. Cl. ................................................ 346/76 PH

[58] Field of Search ............ 219/216 PH; 346/76 PH

[56] References Cited

FOREIGN PATENT DOCUMENTS 0085435 7/1978 Japan .............................. 346/76 PH
0178069 9/1985 Japan .............................. 346/76 PH
0140856 6/1987 Japan .............................. 346/76 PH

*Primary Examiner*—Benjamin R. Fuller
*Assistant Examiner*—Huan Tran
*Attorney, Agent, or Firm*—Finnegan, Henderson, Farabow, Garrett and Dunner

[57] ABSTRACT

A first lead electrode and a second lead electrode are disposed in such a manner as to be offset from each other in a horizontal scanning direction with a heating resistor interposed therebetween, and the width of a major portion of the heating resistor in the horizontal scanning direction is formed to be larger than the widths of the two lead electrodes in the same direction. It can be considered that peripheral portions of the heating resistor where their calorific value is essentially small are partially cut off together with parts of the lead electrodes at opposite ends thereof within the range that does not adversely affect the modulation of a heating area. Heat efficiency can be improved by supressing thermal diffusions in the peripheral portions where the calorific value is small, thereby contributing to recording of a clearer half-tone image.

12 Claims, 3 Drawing Sheets

THERMAL HEAD

BACKGROUND OF THE INVENTION

1. Field of the Invention

The present invention relates to a thermal head used for a recording apparatus of a thermal recording method.

2. Description of the Related Art

Generally, a thermal head of this type is arranged such that a plurality of heating resistors each having two lead electrodes at opposite ends thereof are arranged in a horizontal scanning direction for recording, and are laminated on an insulating substrate by means of thin film technology.

The thermal head having the above-described arrangement, which is adopted in various types of thermal printers of the thermal recording method, can be heated by selectively applying a driving current corresponding to an image signal to the plurality of heating resistors via the opposite lead electrodes thereof.

For instance, in a thermal recording apparatus, as thermal recording paper is brought into direct contact with heated areas of the heating resistors to cause coloration, it is possible to obtain a recorded image corresponding to the image signal.

In addition, in a thermal transfer recording apparatus, it is possible to cope with the recording of an image using plain paper by causing the ink of a heat transfer ribbon to be melted by the heated areas of the heating resistors and transferring the image onto the recording paper.

Furthermore, in a recording apparatus using a heat subliming ribbon as a recording medium, a recorded image can be formed by causing the ink of the heat-subliming ribbon to be sublimed by the heating energy and transferred onto the recording paper.

With this type of thermal printer, not only a binary image of black and white but also a half-tone image such as a photograph can be recorded depending on the arrangement of the heating resistors of the thermal head.

FIG. 6 illustrates an example of the structure of a conventional thermal head which is capable of modulating the area of heating dots used in the aforementioned half-tone image recording.

This thermal head is formed by lamination by means of the aforementioned thin film technology. A plurality of heating resistors 2*a*, 2*b*, 2*c*, . . . are arranged on an insulating substrate 1 formed of, for example, a ceramic or alumina in a horizontal scanning direction, and first lead electrodes 3*a*, 3*b*, 3*c*, . . . and second lead electrodes 4*a*, 4*b*, 4*c*, . . . each having a rectangular configuration are respectively connected in series with opposite ends of the heating resistors 2*a*, 2*b*, 2*c*, . . .

The configuration of each of the heating resistors 2*a*, 2*b*, 2*c*, . . . forms a parallelogram which is surrounded by two lines parallel with the direction of their arrangement (horizontal scanning direction) and two mutually parallel lines that intersect those two lines at a predetermined angle.

This configuration has been determined on the basis of the results of various experiments so that a heating distribution characteristic particularly suitable for the heating-dot modulation for half-tone recording can be obtained. During heating and driving, the heating resistor exhibits a current distribution such as the one shown in FIG. 7.

That is, in FIG. 7, points of measurement are indicated by dots, and the direction of a line extending from each dot indicates the direction of the current at that point of measurement, while the length of the line indicates the magnitude of the current at that point of measurement.

It can be appreciated from this diagram that the distribution of a current flowing across a heating resistor 2*n*, when heated and driven, is denser toward its central portion, and coarser toward its peripheral portion.

This will be apparent from a demonstration taking note of a formula shown below.

Generally, assuming that voltage is v and electrical conductivity is $\sigma$, current i flowing across a point in the heating resistor 2*n*, when heated and driven, is expressed by the formula:

$$\vec{I} = \sigma\left(\frac{\partial v}{\partial v}, \frac{\partial v}{\partial v}\right) \qquad (1)$$

Hence, the voltage v is expressed by the following Laplace equation:

$$\frac{\partial^2 v}{\partial x^2} + \frac{\partial^2 v}{\partial y^2} = 0 \qquad (2)$$

This Laplace equation can be solved by a boundary element method which is one calculating method using a computer, and a current vector can be determined.

FIG. 7 illustrates a distribution of current vectors determined by the above-described method, and it is apparent that the current becomes larger toward the central portion of the heating resistor 2*n*, i.e., that the current concentrates.

Here, if its resistance is assumed to be R, a calorific value E at a point in the heating resistor 2*n* can be expressed by the following formula:

$$E = Ri^2 \qquad (3)$$

In other words, the calorific value E is proportional to the square of the current i.

Consequently, in the heating resistor 2*n* having a current distribution such as the one shown in FIG. 7, the central portion where the current distribution is dense and the current value is large exhibits a conspicuously large calorific value as compared with the peripheral portion where the current distribution is coarse and the current value is small.

Here, the calorific value E changes in correspondence with the value of the current i on the basis of the aforementioned Formula (3), and this calorific value E causes the density of a recording dot during actual recording to change in correspondence with the size of the heating dot at that time.

By making use of this action, it is possible to realize recording with a desired gradation by adjusting the current i to be supplied to the heating resistor 2*n* in accordance with the density of an image signal.

To effect recording positively with a clear gradation, it is desirable that the response characteristics of the calorific value E with respect to the driving current i be good, and for this purpose it is necessary to maintain the thermal efficiency at as high a level as possible.

In this respect, with the above-described conventional thermal head, the heating resistor 2$n$ does not exhibit a sufficiently high thermal efficiency owing to the factors which will be described below.

That is, in the conventional thermal head, the area of the peripheral portion is large in view of the heating characteristic inside the heating resistor 2$n$ in correspondence with the current distribution shown in FIG. 7, i.e., the characteristic that the calorific value is greater toward the central portion. Hence, thermal diffusion from this peripheral portion is liable to occur.

This type of thermal diffusion occurs due to the fact that the calorific value at the peripheral portion is smaller than at the central portion, and is particularly noticeable in acute-angled portions of the parallelogram where the current distribution is remarkably coarse.

In addition, concerning the same configuration, the first lead electrode 3$n$ and the second lead electrode 4$n$ are formed with a width which is identical with that of that side of the parallelogrammatic heating resistor 2$n$ which extends in the horizontal scanning direction. Hence, the abutting width of each of the lead electrodes 3$n$, 4$n$ for connection to the heating resistor 2$n$ is very large.

That side of the heating resistor 2$n$ which extends in the horizontal scanning direction includes the aforementioned acute-angled portion of the parallelogram, and tends to display a locally small calorific value.

The fact that the lead electrodes 3$n$, 4$n$ abut on each side of the heating resistor 2$n$ in this condition with a large width further promotes the aforementioned thermal diffusion.

As a result, the thermal efficiency of the heating resistor 2$n$ has been extremely low, and the heat response characteristic with respect to the driving current has been deteriorated.

Hence, with the recording apparatus using this type of conventional thermal head, there has been a problem in that the resolution decreases in conjunction with the deterioration of the heat response characteristic of the heating resistor 2$n$, thereby making it impossible to obtain a half-tone recorded image of an excellent quality.

SUMMARY OF THE INVENTION

Accordingly, an object of the present invention is to provide a thermal head which is capable of modulating the area of heating dots to cope with the recording of a half-tone image.

Another object of the present invention is to provide a thermal head in which thermal diffusion ascribable to the configurations of heating resistors and lead electrodes each provided at opposite ends thereof can be reduced as practically as possible, and which makes it possible to obtain a half-tone recorded image of an excellent quality under the condition of a high thermal efficiency.

Still another object of the present invention is to provide a thermal head which facilitates the design of a configuration of a heating resistor for securing a high thermal efficiency.

To these ends, according to the present invention, there is provided a thermal head in which a plurality of heating resistors are arranged in a horizontal scanning direction, and first and second lead electrodes are respectively connected in series with opposite ends of the heating resistors located in a direction that intersects the horizontal scanning direction, wherein the first and second lead electrodes corresponding to each one of the heating resistors are disposed in such a manner as to be offset from each other in the horizontal scanning direction with each of the heating resistors interposed therebetween.

In addition, according to the present invention, there is provided a thermal head in which a plurality of heating resistors are arranged in a horizontal scanning direction, and first and second lead electrodes are respectively connected in series with opposite ends of the heating resistors located in a direction that intersects the horizontal scanning direction, wherein the first and second lead electrodes corresponding to each one of the heating resistors are disposed in such a manner as to be offset from each other in the horizontal scanning direction with each of the heating resistors interposed therebetween, and the width of a central portion of each of the heating resistors between the first and second lead electrodes in the horizontal scanning direction is formed to be greater than the widths of abutment of the first and second lead electrodes with respect to the heating resistor in the same direction.

Furthermore, in accordance with another aspect of the invention, there is provided a thermal head in which a plurality of heating resistors are arranged in a horizontal scanning direction, and first and second lead electrodes are respectively connected in series with opposite ends of the heating resistors located in a direction that intersects the horizontal scanning direction, wherein the first and second lead electrodes corresponding to each one of the heating resistors are disposed in such a manner as to be offset from each other in the horizontal scanning direction with each of the heating resistors interposed therebetween and are formed with different widths, and the width of a central portion of each of the heating resistors between the first and second lead electrodes in the horizontal scanning direction is formed to be greater than either one of the widths of abutment of the first and second lead electrodes with respect to the heating resistor in the same direction.

Thus, in the present invention, since the first and second lead electrodes are disposed in such a manner as to be offset from each other with respect to the horizontal scanning direction, it is possible to impart to the heating resistor interposed between the opposing electrodes a heating distribution characteristic suitable for the heating dot modulation for recording a half-tone image, i.e., a heating characteristic that the calorific value is greater toward its central portion.

In addition, in the present invention, the configuration is such that after those peripheral portions (a current distribution is coarse) of the heating resistor that do not substantially contribute to the formation of a heating dot are cut off, and the heating resistor is connected to the lead electrodes at opposite ends thereof, the heating resistor having a width greater than the widths of the lead electrodes in the horizontal scanning direction. Therefore, it is possible to minimize the thermal diffusion by virtue of a synergistic effect that the heating resistor is formed only by a portion having a relatively high calorific value, and the abutting widths of the heating resistor and the lead electrodes at opposite ends thereof are made smaller. Thus, it is possible to realize recording with clear gradations while maintaining a high thermal response characteristic.

Furthermore, in the present invention, since the thermal head is provided with the first and second lead electrodes having mutually different widths in the horizontal scanning direction, at the time of obtaining a heating resistor which satisfies a condition that the heating resistor is provided with a greater width than either one of the lead electrodes with respect to the horizontal scanning direction, the definition of its region suffices if the one ends of the opposing lead electrodes are respectively connected by straight lines. Thus, the designing of a configuration of this type of heating resistor is facilitated remarkably.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a detailed description will be given of the preferred embodiments of the present invention.

Figure 1:
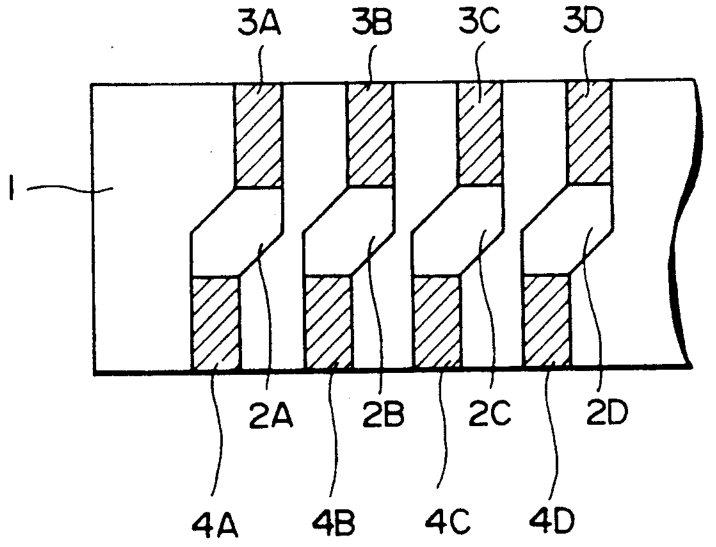
FIG. 1 is a top plan view of a configuration of a thermal head in accordance with an embodiment of the present invention.

FIG. 1 is a top plan view illustrating a configuration of a thermal head in accordance with an embodiment of the present invention.

In FIG. 1, the thermal head comprises an insulating substrate 1 formed of a ceramic, alumina, or the like: heating resistors 2A, 2B, 2C, . . . formed on the insulating substrate 1; first lead electrodes 3A, 3B, 3C, . . . each connected to one end of each of the heating resistors 2A, 2B, 2C, . . . ; and second lead electrodes 4A, 4B, 4C, . . . each connected to the other end of each of the heating resistors 2A, 2B, 2C, . . .

In the thermal head of the present invention, the heating resistors 2A, 2B, 2C, . . . are arranged in the horizontal scanning direction at predetermined intervals, and the first lead electrodes 3A, 3B, 3C, . . . and the second lead electrodes 4A, 4B, 4C, . . . are respectively connected in series with opposite ends of the heating resistors 2A, 2B, 2C, . . . that are located in the direction which intersects the horizontal scanning direction.

The first lead electrodes 3A, 3B, 3C, . . . and the second lead electrodes 4A, 4B, 4C, . . . corresponding thereto are disposed at positions offset from each other with respect to the horizontal scanning direction.

That is, the positions are set in such a manner that the central lines of the first lead electrodes 3A, 3B, 3C, and the central line of each of the second lead electrodes 4A, 4B, 4C, . . . with respect to a direction perpendicular to the horizontal scanning direction do not exist on the same lines.

In addition, in the thermal head in accordance with the present invention, with respect to the configuration of the heating resistors 2A, 2B, 2C, . . . respectively interposed between the first lead electrodes 3A, 3B, 3C, . . . and the second lead electrodes 4A, 4B, 4C, . . . , the width in the horizontal scanning direction of a central portion of each heating resistor 2A, 2B, 2C, . . . in a direction perpendicular to the horizontal scanning direction is set to be greater than the width in the same direction of the corresponding first lead electrodes 3A, 3B, 3C, . . . and second lead electrodes 4A, 4B, 4C, . . ..

Thus, in the thermal head of the present invention, the configurations of the heating resistors 2A, 2B, 2C, . . . , the first lead electrodes 3A, 3B, 3C, . . . , and the second lead electrodes 4A, 4B, 4C, . . . differ from those of conventional ones.

Figure 2:
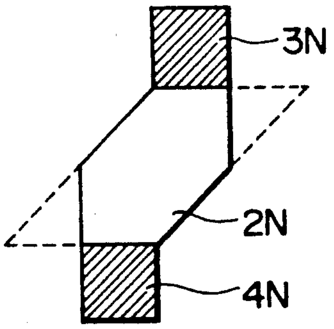
FIG. 2 is an enlarged view illustrating an example of configurations of a heating resistor and lead electrodes disposed at opposite ends thereof in the thermal head in accordance with the present invention.

Referring to FIG. 2 which is an enlarged view of the structure of an essential portion of the thermal head shown in FIG. 1, a detailed description will be given of a specific example of the configurations that are different from conventional ones.

In FIG. 2, a first lead electrode 3N and a second lead electrode 4N corresponding thereto are disposed at mutually offset positions with respect to the horizontal scanning direction.

In addition, a heating resistor 2N interposed between the first lead electrode 3N and the second lead electrode 4N is formed in a region surrounded by two mutually parallel straight lines respectively extending in a direction perpendicular to the horizontal scanning direction from the respective one edges (the right-hand edge of the first lead electrode 3N and the left-hand edge of the second lead electrode 4N) of the opposing first lead electrode 3N and second lead electrode 4N that cause a maximum positional offset in the horizontal scanning direction, and by the other mutually parallel two straight lines diagonally and outwardly extending from the other edges (the left-hand edge of the first lead electrode 3N and the right-hand edge of the second lead electrode 4N) of the first lead electrode 3N and the second lead electrode 4N.

As a result, the width of a major portion of the heating resistor 2N in the horizontal scanning direction is greater than the widths in the same direction of the first lead electrode 3N and the second lead electrode 4N.

If an analysis is made of the configurations shown in FIG. 2, it can be considered that peripheral portions, including the acute angled portions, of the parallelogram indicated by dotted lines in the drawing (corresponding to the configuration of the conventional heating resistor 2*n*) are partially cut off.

Similarly, with respect to the first lead electrode 3N and the second lead electrode 4N, it can be considered that their widths in the horizontal scanning direction are formed in order to conform with the width of the partially cut-off heating resistor 2N.

In conjunction with this processing, the abutting widths of the first lead electrode 3N and the second lead electrode 4N with respect to the heating resistor 2N become substantially smaller To operate the thermal head (see FIG. 1) of the present invention having the above-described internal configuration, it suffices if a predetermined driving current is allowed to flow across the opposite lead electrodes 3A, 3B, 3C, . . . and 4A, 4B, 4C, . . . that are connected to arbitrarily selected ones of the heating resistors 2A, 2B, 2C, . . . in accordance with a pattern of picture elements.

Figure 3:
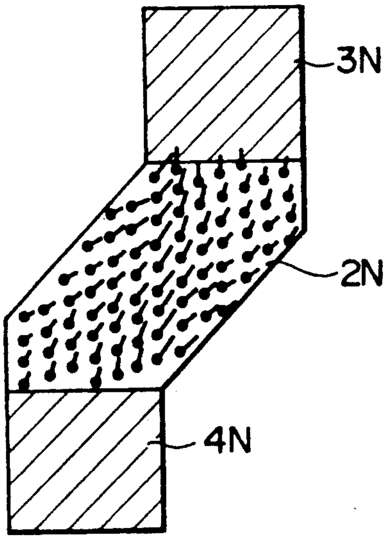
FIG. 3 is a diagram explaining a current distribution characteristic inside the heating resistor when the thermal head in accordance with the present invention is heated and driven.
Figure 4A:
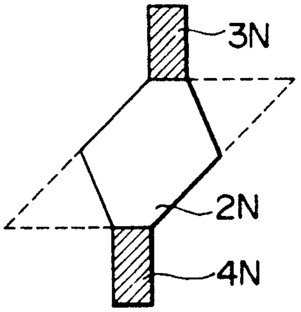
FIGS. 4(*a*) to 4(*f*) are enlarged views illustrating various modifications of the configurations of the heating resistor and the lead electrodes disposed at opposite ends thereof in the thermal head in accordance with the embodiment of the present invention.
Figure 4B:
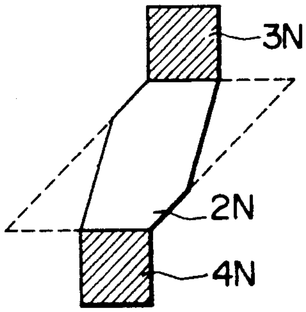
Figure 4C:
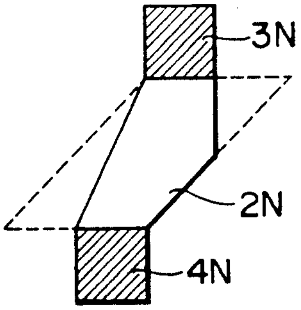
Figure 4D:
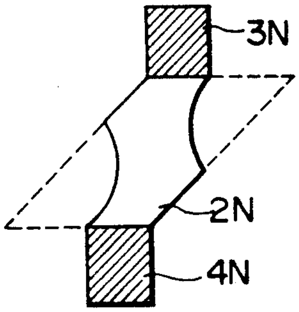
Figure 4E:
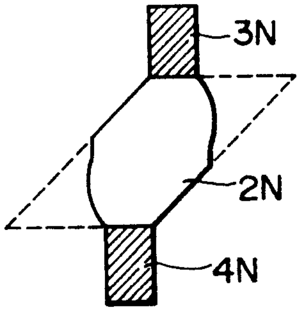
Figure 4F:
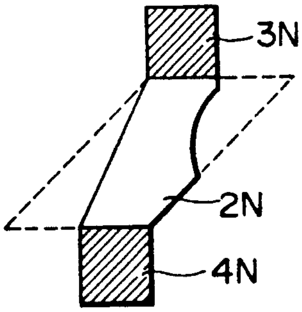

When the thermal head is driven, a current distribution inside the heating resistor 2N (see FIG. 2) becomes like the one shown in FIG. 3.

As is apparent from the drawing, the current distribution inside the heating resistor 2N in this case becomes denser and the current value larger as the point of measurement is located the more closely to the central portion, while the current distribution becomes coarser and the current value smaller as the point of measurement is located the more closely to the peripheral portion.

This current distribution characteristic is derived from the fact that the first lead electrodes 3A, 3B, 3C, . . . and the second lead electrodes 4A, 4B, 4C, . . . corresponding thereto are disposed at mutually offset positions with respect to the horizontal scanning direction.

Figure 7:
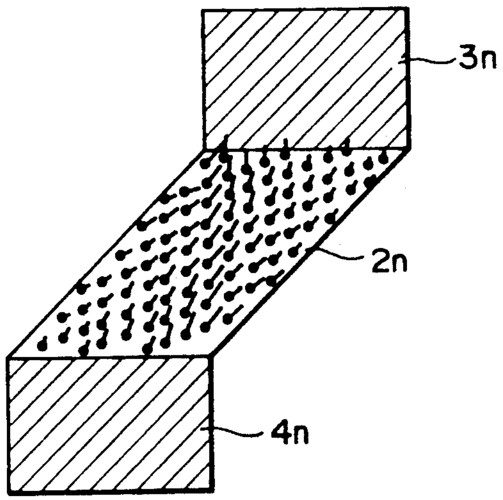
FIG.7 (PRIOR ART)
FIG. 7 is a diagram explaining a current distribution characteristic inside a heating resistor when the conventional thermal head is heated and driven.

This current distribution characteristic itself is similar to the current distribution characteristic of the conventional thermal head shown in FIG. 7, but thermal diffusion in the heating resistor 2N acts differently from the conventional manner owing to the difference in its configuration.

For instance, in the thermal head of the present invention, the abutting widths of the first lead electrode 3N and the second lead electrode 4N on the one hand, and the heating resistor 2N on the other, are made smaller, thermal diffusion during heating and driving can be reduced as compared with the conventional arrangement. Thus, it is possible to increase the thermal efficiency by that margin.

When a half-tone image such as a photograph is recorded with the above-described thermal head, a recorded image with a predetermined gradation is formed on recording paper while the heating dot modulation is being effected by varying a driving current flowing across the opposite lead electrodes 3A, 3B, 3C, . . . and 4A, 4B, 4C, . . . connected to the heating resistors 2A, 2B, 2C, . . . in correspondence with the density of the image to be recorded.

At that time, in the thermal head of the present invention, the thermal response characteristic of the heating resistor 2N with respect to the driving current improves in conjunction with the aforementioned improvement in thermal efficiency.

For this reason, control of the heating dot modulation is facilitated, and a clear expression of the gradation becomes possible as a result.

In the present invention, as is apparent in view of the current distribution characteristic shown in FIG. 3, the arrangement provided is such that the central portion of the heating resistor 2N where the current distribution is dense is left as it is, and only the peripheral portions where the current distribution is coarse are cut off. However, since the calorific value is essentially small in these cut-off portions, the cutting-off itself does not affect the recording accuracy.

Conversely, because thermal diffusion is liable to occur in these cut-off portions since their calorific value is small, in the thermal head of the present invention in which these portions are cut off, it is possible to remarkably increase the thermal efficiency in conjunction with the action derived from the fact that the abutting widths of the heating resistor 2A, 2B, 2C, . . . and the opposite lead electrodes 3N and 4N are made small. Thus, it is possible to provide a better condition for recording an image with clear gradations.

With respect to the above-described configurations of the heating resistor 2N, the first lead electrode 3N, and the second lead electrode 4N, various modifications are possible within the scope of the appended claims of the invention, as shown in FIGS. 4(*a*) to 4(*f*).

First, in the example shown in FIG. 4(*a*), the heating resistor 2N is formed in a region surrounded by two straight lines respectively extending diagonally and outwardly from the opposite edges of the first lead electrode 3N, and by two straight lines respectively extending diagonally and outwardly from the opposite edges of the second lead electrode 4N.

In the example shown in FIG. 4(*b*), the heating resistor 2N is formed in a region surrounded by two straight lines respectively extending diagonally and inwardly from the one edges of the opposing first lead electrode 3N and second lead electrode 4N, which cause a maximum positional offset in the horizontal scanning direction, and by other two straight lines respectively extending diagonally and outwardly from the other edges of the first lead electrode 3N and the second lead electrode 4N.

In the example shown in FIG. 4(*c*), the heating resistor 2N is formed in a region surrounded by a straight line connecting one opposing ends of the first lead electrode 3N and the second lead electrode 4N and by two straight lines respectively extending in arbitrary directions from the other edges of the first and second lead electrodes 3N and 4N.

The above examples illustrate configurations in which, with respect to the heating resistor 2N, acutely-angled portions of the parallelograms indicated by dotted lines in the respective drawings are rectilinearly cut off. However, these portions may be partially cut off not by straight lines but by curves.

In the example shown in FIG. 4(*d*), with respect to the configuration of the heating resistor 2N shown in FIG. 2, sides of the heating resistor 2N which are defined by mutually parallel two straight lines respectively extending in directions perpendicular to the horizontal scanning direction from the one ends of the opposing first lead electrode 3N and second lead electrode 4N that cause a maximum positional offset in the horizontal scanning direction are cut off in the form of a circular arc from the aforementioned viewpoint.

In contrast, in the example shown in FIG. 4(*e*), with respect to the configuration of the heating resistor 2N shown in FIG. 2, sides of the heating resistor 2N which are defined by mutually parallel two straight lines respectively extending in directions perpendicular to the horizontal scanning direction from the one ends of the opposing first lead electrode 3N and second lead electrode 4N that cause a maximum positional offset in the horizontal scanning direction are expanded in the form of a circular arc.

It goes without saying that this type of processing into the configuration of a circular arc may also be effected for the heating resistors 2N shown in FIGS. 4(*a*) to 4(*c*).

For example, in the one shown in FIG. 4(*f*), with respect to the configuration of the heating resistor 2N shown in FIG. 4(*c*), the sides of the heating resistor 2N defined by the two straight lines respectively extending from the edges of the first and second lead electrodes 3N and 4N in arbitrary directions are cut off into the configuration of a circular arc.

The foregoing embodiment and its modifications respectively concern thermal heads in which the widths of the first and second lead electrodes 3N and 4N in the horizontal scanning direction are identical.

In the present invention, it is possible to provide a thermal head in which the widths of the first and second lead electrodes 3N and 4N in the horizontal scanning direction are different.

Figure 5A:
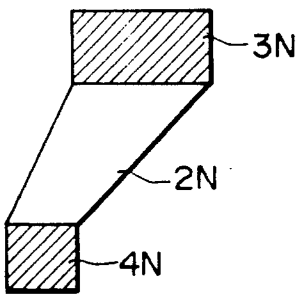
FIGS. 5(*a*) to 5(*c*) are enlarged views illustrate various modifications of the configurations of the heating resistor and the lead electrodes disposed at opposite ends thereof in the thermal head in accordance with another embodiment of the present invention.
Figure 5B:
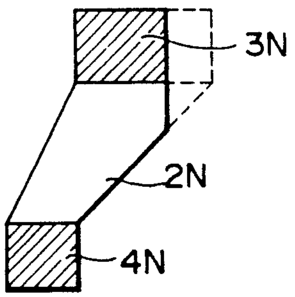
Figure 5C:
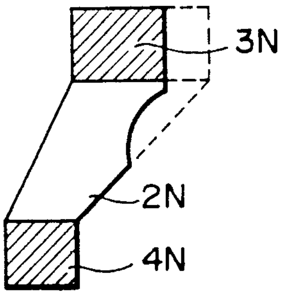
Figure 6:
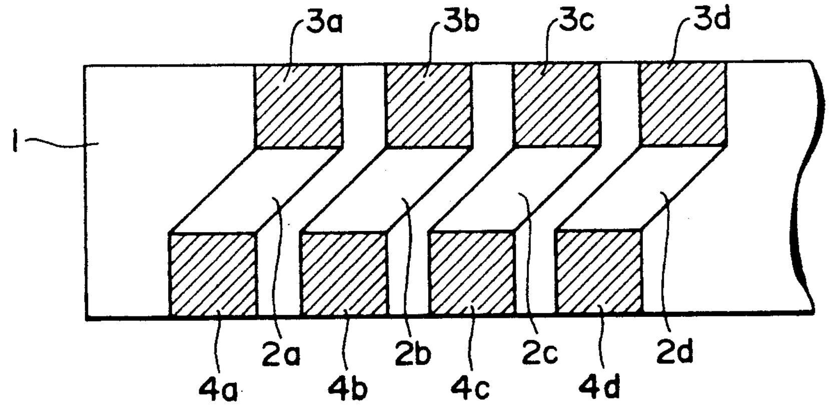
FIG.6 (PRIOR ART)
FIG. 6 is a top plan view illustrating a configuration of a conventional thermal head of this type.

FIGS. 5(*a*) to 5(*c*) are enlarged views respectively illustrating structures of an essential portion of a thermal head in accordance with another embodiment of the present invention, in which the width of the first lead electrode 3N is formed to be greater than the width of the second lead electrode 4N with respect to the horizontal scanning direction.

In the case of the thermal head in accordance with this embodiment, the heating resistor 2N interposed between the first lead electrode 3N and the second lead electrode 4N must satisfy the condition that the width of its central portion in the direction of arrangement of the electrodes is greater than the smaller one of the widths of the first lead electrode 3N and the second lead electrode 4N (corresponding to the second lead electrode 4N in FIGS. 5(*a*) to 5(*c*)).

In the example shown in FIG. 5(*a*), the heating resistor 2N is formed in a region in which the respective one edges of the opposing first lead electrode 3N and second lead electrode 4N are connected by two straight lines that do not intersect each other in order to meet the aforementioned condition.

In the case of this embodiment, in order for the width of the heating resistor 2N to satisfy the aforementioned condition, it suffices if the configuration of the heating resistor 2N is defined by connecting the respective one ends of the opposing lead electrodes 3N and 4N by straight lines. Hence, it is readily possible to design the configuration of the heating resistor 2N.

With respect to the heating resistors of this embodiment as well, various modifications in the manner shown in FIGS. 4(*a*) to 4(*f*) are possible.

For example, in the configuration shown in FIG. 5(*b*), with respect to the configuration of the heating resistor 2N shown in FIG. 5(*a*), a side of the heating resistor 2N defined by a straight line having a greater angle of inclination with respect to the horizontal scanning direction of the two straight lines connecting the one ends of the first lead electrode 3N and the second lead electrode 4N is partially cut off together with part of the lead electrode 3N connected to the heating resistor 2N by a straight line perpendicular to the horizontal scanning direction.

Furthermore, in the configuration shown in FIG. 5(*c*), with respect to the configuration of the heating resistor 2N shown in FIG. 5(*b*), the side of the heating resistor 2N which is defined by the aforementioned straight line having a greater angle of inclination with respect to the horizontal scanning direction and by the aforementioned straight line perpendicular to the horizontal scanning direction is further cut off into the configuration of a circular arc.

The advantages of the embodiments and modifications shown in FIGS. 2, 4(*a*)–4(*f*), and 5(*a*) to 5(*c*) are similar, and it is possible to suppress thermal diffusion to a low level by a portion in which a peripheral portion(s) of the heating resistor 2N is cut off, or in which the width of at least one of the lead electrodes 3N and 4N is made smaller than the width of the heating resistor 2N.

Thus, in the present invention, from the point of view that the abutting widths of the heating resistor 2N and the lead electrodes 3N and 4N disposed at opposite ends thereof are made smaller and a portion(s) of the heating resistor 2N where the calorific value is small during heating and driving is cut off, it is possible to adopt applications in which the configuration of the heating resistor 2N is formed into a rectilinear or curvilinear configuration, and a part(s) of it is cut off into a rectilinear or curvilinear configuration.

As a repercussion effect entailed in the above-described processing, the following can be noted.

That is, in the conventional heating resistor 2*n* having a parallelogrammatic configuration, there are an angle of inclination, length, and width of the heating resistor that are optimal to dot modulation, and if the heating resistor having its original configuration is used, limitations occur to the mounting density, which leads to a decline in the resolution.

In this respect, in the heating resistor 2N according to the present invention, since its peripheral portion which does not directly affect recording, such as its portion where the calorific value is small, is cut off, it is possible to arrange the heating resistor 2N and the lead electrodes 3N, 4N having smaller widths in the horizontal scanning direction, making it possible to secure a higher mounting density than the conventional level. Hence, this results in a higher resolution.

It should be noted that processing for forming the heating resistor 2N and the lead electrodes 3N, 4N in accordance with the embodiments of the present invention can be effected by means of the known thin film technology in a process which is substantially similar to the conventional process in which the heating resistor 2*n* is formed into a parallelogrammatic configuration.

What is claimed is:

1. A thermal head comprising:

a plurality of heating resistors arranged in a horizontal scanning direction, each one of the plurality of heating resistors having a first end portion, a second end portion, and a central heating portion, said central heating portion having a predetermined width in the horizontal scanning direction;

a plurality of first lead electrodes, each one of the plurality of first lead electrodes having a first and second edges extending in a direction that intersects the horizontal scanning direction and being connected to a first end portion of a corresponding one of the plurality of heating resistors to form a first abutment;

a plurality of second lead electrodes, each one of the plurality of second lead electrodes having first and second edges extending in a direction that intersects the horizontal scanning direction and being connected to a second end portion of a corresponding one of the plurality of heating resistors to form a second abutment, each one of the plurality of second lead electrodes being offset from a corresponding one of the plurality of first lead electrodes in the horizontal scanning direction;

wherein said first abutment formed between each one of the plurality of heating resistors and a corresponding one of the plurality of first lead electrodes and said second abutment formed between each one of the plurality of heating resistors and a corresponding one of the plurality of second lead electrodes have a width less than the predetermined width.

2. A thermal head according to claim 1, each one of said plurality of heating resistors formed in a region between said corresponding one of the plurality of first lead electrodes and said corresponding one of the plurality of second lead electrodes bounded by:

a first straight line, perpendicular to the horizontal scanning direction, extending from said first edge of said corresponding one of the plurality of first lead electrodes, said first edge of said corresponding one of the plurality of first lead electrodes being disposed a greater distance from said corresponding one of the plurality of second lead electrodes in the horizontal scanning direction than said second edge of said corresponding one of the plurality of first lead electrodes;

a second straight line, parallel to said first straight line, extending from said first edge of said corresponding one of the plurality of second lead electrodes, said first edge of said corresponding one of the plurality of second lead electrodes being disposed a greater distance from said corresponding one of the plurality of first lead electrodes in the horizontal scanning direction than said second edge of said corresponding one of the plurality of second lead electrodes;

a third straight line, oblique to the horizontal scanning direction, extending from said second edge of said corresponding one of the plurality of first lead electrodes and intersecting said second straight line; and a fourth straight line, parallel to said third straight line, extending from said second edge of said corresponding one of the plurality of second lead electrodes and intersecting said first straight line.

3. A thermal head according to claim 1, each one of said plurality of heating resistors formed in a region between said corresponding one of the plurality of first lead electrodes and said corresponding one of the plurality of second lead electrodes bounded by:

a first straight line, oblique to the horizontal scanning direction, extending from said second edge of said corresponding one of the plurality of first lead electrodes;

a second straight line, parallel to said first straight line, extending from said second edge of said corresponding one of the plurality of second lead electrodes;

a first concave arc extending from said first edge of said corresponding one of the plurality of first lead electrodes to intersect said second straight line, said first edge of said corresponding one of the plurality of first lead electrodes being disposed a greater distance from said corresponding one of the plurality of second lead electrodes in the horizontal scanning direction than said second edge of said corresponding one of the plurality of first lead electrodes;

a second concave arc extending from said first edge of said corresponding one of the plurality of second lead electrodes to intersect said first straight line, said first edge of said corresponding one of the plurality of second lead electrodes being disposed a greater distance from said corresponding one of the plurality of first lead electrodes in the horizontal scanning direction than said second edge of said corresponding one of the plurality of second lead electrodes.

4. A thermal head according to claim 1, each one of said plurality of heating resistors formed in a region between said corresponding one of the plurality of first lead electrodes and said corresponding one of the plurality of second lead electrodes bounded by:

a first straight line, oblique to the horizontal scanning direction, extending from said second edge of said corresponding one of the plurality of first lead electrodes;

a second straight line, parallel to said first straight line, extending from said second edge of said corresponding one of the plurality of second lead electrodes;

a first convex arc extending from said first edge of said corresponding one of the plurality of first lead electrodes to intersect said second straight line, said first edge of said corresponding one of the plurality of first lead electrodes being disposed a greater distance from said corresponding one of the plurality of second lead electrodes in the horizontal scanning direction than said second edge of said corresponding one of the plurality of first lead electrodes;

a second convex arc extending from said first edge of said corresponding one of the plurality of second lead electrodes to intersect said first straight line, said first edge of said corresponding one of the plurality of second lead electrodes being disposed a greater distance from said corresponding one of the plurality of first lead electrodes in the horizontal scanning direction than said second edge of said corresponding one of the plurality of second lead electrodes.

5. A thermal head according to claim 1, each one of said plurality of heating resistors formed in a region between said corresponding one of the plurality of first lead electrodes and said corresponding one of the plurality of second lead electrodes bounded by:

a first straight line, oblique to the horizontal scanning direction, extending from said first edge of said corresponding one of the plurality of first lead electrodes in a direction away from said second edge of said corresponding one of the plurality of first lead electrodes in a direction away from said second edge of said corresponding one of the plurality of first lead electrodes;

a second straight line, oblique to the horizontal scanning direction, extending from said second edge of said corresponding one of the plurality of first lead electrodes in a direction away from said first edge of said corresponding one of the plurality of first lead electrodes;

a third straight line, oblique to the horizontal scanning direction, extending from said first edge of said corresponding one of the plurality of second lead electrodes in a direction away from said second edge of said corresponding one of the plurality of second lead electrodes;

a fourth straight line, oblique to the horizontal scanning direction, extending from said second edge of said corresponding one of the plurality of second lead electrodes in a direction away from said first edge of said corresponding one of the plurality of second lead electrodes.

6. A thermal head according to claim 1, each one of said plurality of heating resistors formed in a region between said corresponding one of the plurality of first lead electrodes and said corresponding one of the plurality of second lead electrodes bounded by:

a first straight line, oblique to the horizontal scanning direction, extending from said first edge of said corresponding one of the plurality of first lead electrodes in a direction away from said second edge of said corresponding one of the plurality of first lead electrodes in a direction towards said second edge of said corresponding one of the plurality of first lead electrodes, said first edge of said first corresponding one of the plurality of first lead electrodes being disposed a greater distance from said corresponding one of the plurality of second lead electrodes in the horizontal scanning direction than said second edge of said corresponding one the plurality of first lead electrodes;

a second straight line, oblique to the horizontal scanning direction, extending from said first edge of said corresponding one of the plurality of second lead electrodes, in a direction towards said second edge of said corresponding one of the plurality of second lead, said first edge of said corresponding one of the plurality of second lead electrode being disposed a greater distance from said corresponding one of the plurality of first lead electrodes in the horizontal scanning direction than said second edge of said corresponding one of the plurality of second lead electrodes;

a third straight line, oblique to the horizontal scanning direction, extending from said second edge of said corresponding one of the plurality of first lead electrodes in a direction away from said first edge of said corresponding one of the plurality of first lead electrodes and intersecting said second straight line; and a fourth straight line, oblique to the horizontal scanning direction, extending from said second edge of said corresponding one of the plurality of second lead electrodes in a direction away from said first edge of said corresponding one of the plurality of second lead electrodes and intersecting said first straight line.

7. A thermal head according to claim 1, each one of said plurality of heating resistors formed in a region between said corresponding one of the plurality of first lead electrodes and said corresponding one of the plurality of second lead electrodes bounded by:

a first straight line extending from said first edge of said corresponding one of the plurality of first lead electrodes to said second edge of said corresponding one of the plurality of second lead electrodes, said first edge of said corresponding one of the plurality of first lead electrodes being disposed a greater distance from said corresponding one of the plurality of second lead electrodes in the horizontal scanning direction than said second edge of said corresponding one of the plurality of first lead electrodes;

a second straight line, oblique to the horizontal scanning direction, extending from said second edge of said corresponding one of the plurality of first lead electrodes, in a direction away from said first edge of said corresponding one of the plurality of first lead electrodes; and a third straight line, perpendicular to the horizontal scanning direction, extending from said first edge of said corresponding one of the plurality of second lead electrodes, said first edge of said corresponding one of the plurality of second lead electrodes being disposed a greater distance from said corresponding one of the plurality of first lead electrodes in the horizontal scanning direction than said second edge of said corresponding one of the plurality of second lead electrodes.

8. A thermal head according to claim 1, each one of said plurality of heating resistors formed in a region between said corresponding one of the plurality of first lead electrodes and said corresponding one of the plurality of second lead electrodes bounded by:

a first straight line extending from said first edge of said corresponding one of the plurality of first lead electrodes to said second edge of said corresponding one of the plurality of second lead electrodes, said first edge of said corresponding one of the plurality of first lead electrodes being disposed a greater distance from said corresponding one of the plurality of second lead electrodes in the horizontal scanning direction than said second edge of said corresponding one the plurality of first lead electrodes;

a second straight line, oblique to the horizontal scanning direction, extending from said second edge of said corresponding one of the plurality of first lead electrodes in a direction away from said first edge of said one of the plurality of first lead electrodes; and a concave arc extending from said first edge of said corresponding one of the plurality of second lead electrodes, said first edge of said corresponding one of the plurality of second lead electrodes being disposed a greater distance from said corresponding one of the plurality of first lead electrodes in the horizontal scanning direction than said second edge of said corresponding one of the plurality of second lead electrodes.

9. A thermal head comprising:

a plurality of heating resistors arranged in a horizontal scanning direction, each one of the plurality of heating resistors including a first end portion having a first width, a second end portion having a second width, said second width being less than said first width in the horizontal scanning direction;

a plurality of first lead electrodes, each one of the plurality of first lead electrodes having first and second edges extending in a direction that intersects the horizontal scanning direction and being connected to a first end portion of a corresponding one of the plurality of heating resistors to form a first abutment having said first width;

a plurality of second lead electrodes, each one of the plurality of first lead electrodes having first and second edges extending in a direction that intersects the horizontal scanning direction and being connected to a second end portion of a corresponding one of the plurality of heating resistors to form a second abutment having said second width, each one of said plurality of second lead electrodes being offset from a corresponding one of said plurality of first lead electrodes in the horizontal scanning direction.

10. A thermal head according to claim 9, each one of said plurality of heating resistors formed in a region between said corresponding one of the plurality of first lead electrodes and said corresponding one of the plurality of second lead electrodes bounded by:

first straight line, oblique to the horizontal scanning direction, extending from said first edge of said corresponding one of the plurality of first lead electrodes to said second edge of said corresponding one of the plurality of second lead electrodes, said first edge of said corresponding one of the plurality of first lead electrodes being disposed a greater distance from said corresponding one of the plurality of second lead electrodes in the horizontal scanning direction than said second edge of said corresponding one of the plurality of first lead electrodes; and a second straight line, oblique to the horizontal scanning direction, extending from said second edge of said corresponding one of the plurality of first lead electrodes to said first edge of said corresponding one of the plurality of second lead electrodes, said first edge of said corresponding one of the plurality of second lead electrodes being disposed a greater distance from said corresponding one of the plurality of first lead electrodes in the horizontal scanning direction than said second edge of said corresponding one of the plurality of second lead electrodes.

11. A thermal head according to claim 9, each one of said plurality of heating resistors formed in a region between said corresponding one of the plurality of first lead electrodes and said corresponding one of the plurality of second lead electrodes bounded by:

a first straight line extending from said first edge of said corresponding one of the plurality of first lead electrodes to said second edge of said corresponding one of the plurality of second lead electrodes, said first edge of said corresponding one of the plurality of first lead electrodes being disposed a greater distance from said corresponding one of the plurality of second lead electrodes in the horizontal scanning direction than said second edge of said corresponding one the plurality of first lead electrodes;

a second straight line, oblique to the horizontal scanning direction, extending from said second edge of said corresponding one of the plurality of first lead electrodes in a direction away from said first edge of said corresponding one of the plurality of second lead electrodes; said first edge of said corresponding one of the plurality of second lead electrodes being disposed a greater distance from said corresponding one of the plurality of first lead electrodes in the horizontal scanning direction than said second edge of said corresponding one of the plurality of second lead electrodes; and a third straight line, perpendicular to the horizontal scanning direction, extending from said second edge of said corresponding one of the plurality of first lead electrodes and intersecting said second straight line.

12. A thermal head according to claim 9, each one of said plurality of heating resistors formed in a region between said corresponding one of the plurality of first lead electrodes and said corresponding one of the plurality of second lead electrodes bounded by:

a first straight line extending from said first edge of said corresponding one of the plurality of first lead electrodes to said second edge of said corresponding one of the plurality of second lead electrodes, said first edge of said corresponding one of the plurality of first lead electrodes being disposed a greater distance from said corresponding one of the plurality of second lead electrodes in the horizontal scanning direction than said second edge of said corresponding one the plurality of first lead electrodes;

a second straight line, oblique to the horizontal scanning direction, extending from said first edge of said corresponding one of the plurality of second lead electrodes in a direction away from said second edge of said corresponding one of the plurality of second lead electrodes, said first edge of said corresponding one of the plurality of second lead electrodes being disposed a greater distance from said corresponding one of the plurality of first lead electrodes in the horizontal scanning direction than said second edge of said corresponding one of the plurality of second lead electrodes; and a concave arc extending from said second edge of said corresponding one of the plurality of first lead electrodes and intersecting said second straight line.

* * * * *